May 1, 1945.    S. V. HAAS, JR    2,374,815
SPRING COUPLING
Filed July 30, 1943
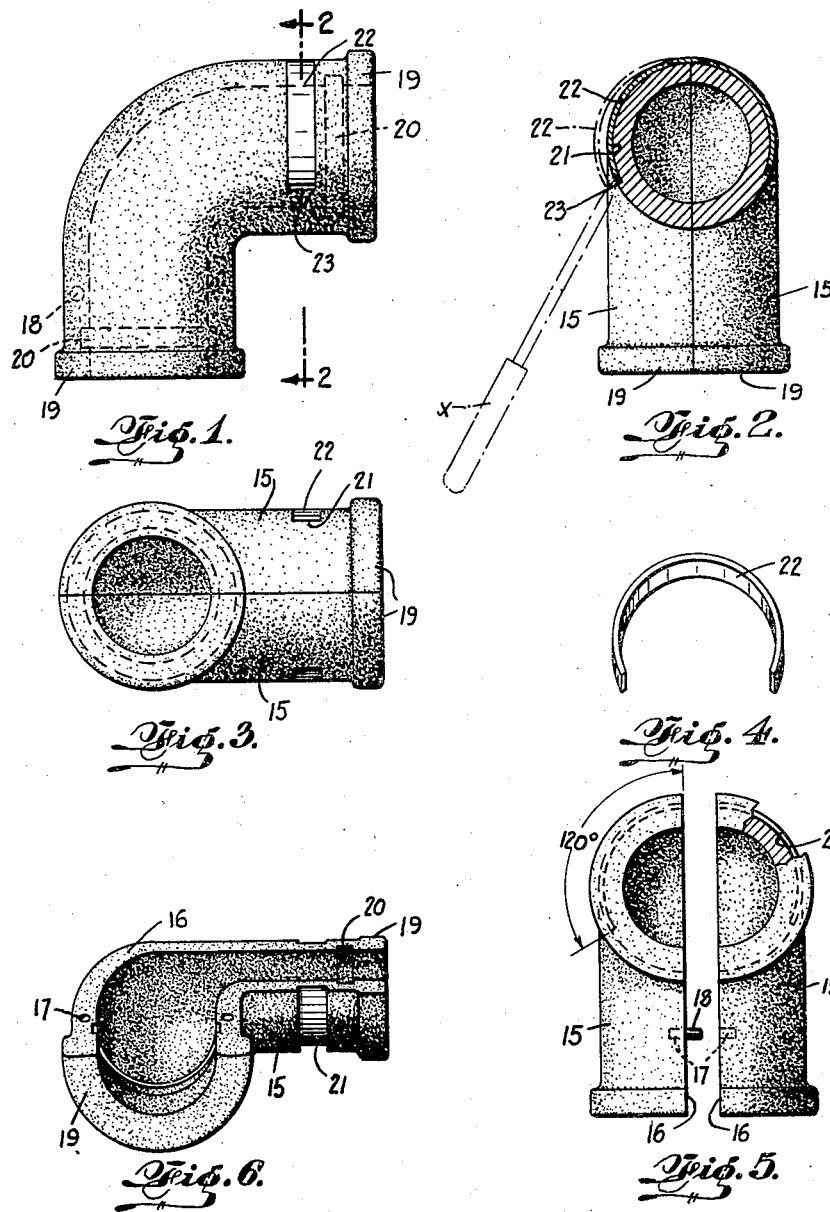
INVENTOR.
SIDNEY V. HAAS, JR.
BY
Cousins & Cousins
ATTORNEYS.

Patented May 1, 1945

2,374,815

UNITED STATES PATENT OFFICE 2,374,815

SPRING COUPLING

Sidney V. Haas, Jr., East Orange, N. J., assignor to Breeze Corporations, Inc., Newark, N. J., a corporation of New Jersey Application July 30, 1943, Serial No. 496,827

1 Claim. (Cl. 285—211)

This invention relates to spring clamps for coupling the two equal halves of cylinders as a unit.

It is common practice to die-cast or mold many cylindrical objects, such as elbows, sleeves, collars and the like, in two parts, with or without flanges, bosses, or other alining means and securing them in position by clamping devices, often objectionable by reason of cumbersome protruding elements, requiring space and presenting an undesirable appearance.

It is therefore an object of this invention to provide means for joining the halves of such cylindrical objects, hollow or solid, in such manner as to retain them in firm relation, but permitting separation when desired.

A further object is in the provision of a spring bond, fitting snugly in a recess in the halves of the object, whereby relative end movement of the parts is prevented, and the peripheral surface of the united parts is rendered substantially smooth and uniform throughout.

Another purpose is to produce an inserted spring clamp adapted to snap within a partial annular recess in each of the two halves and having means for the insertion of an implement for removal of the clamp.

These and other analogous objects, such as simplicity, speed in application, and efficiency in operation, are accomplished by the novel and practical construction, combination and arrangement of parts hereinafter described and illustrated in the accompanying drawing, constituting a graphical component of this disclosure, and in which:

Figure 1 is a side view of a conventional type two-part elbow, showing an application of an embodiment of the invention.

Figure 2 is a transverse sectional view, partly in elevation, taken on line 2—2 of Figure 1.

Figure 3 is a bottom plan view of the elbow.

Figure 4 is a perspective view of the spring clamp in detail.

Figure 5 is a side view of the halves of the elbow, shown in spaced relation and broken away to show the constraining band.

Figure 6 is a perspective view of one of the elbow halves, looking from its inner, proximate side.

The elbow shown in the drawing is to be regarded as merely suggestive of any two-part object, having at least one substantially cylindrical portion when united, and is not to be considered as restrictive of the invention to the article indicated.

Both of the two equal parts 15 are assumed to be cast or molded in similar right and left dies, and therefore fit together.

As shown, the contacting faces 16 are smooth, level and continuous; each may preferably be provided with one or more small circular holes 17 to receive dowel pins 18 by which the parts are held in proper alignment.

Semi-annular flanges 19 may be formed on the ends of the objects, and internal recesses 20 may be provided for making connections with other parts.

The invention resides in the formation of arcuate recesses 21 in any preferred portion of the semi-cylindrical halves, these recesses being of uniform depth and width to extend from the flat, chordal faces 16 to points definitely beyond the axial center, through an arc of approximately 120 degrees.

Fitted to these recesses is a single spring 22, arcuately curved to a radius less than that of the recesses 21 and of slightly lesser length, so as to present a narrow opening 23 at one end, while its opposite end abuts the end of the recess in the opposed side; it is considered preferable to bevel or undercut at least one of the ends of the spring at a somewhat acute angle, rather than radial, as an aid in removal.

This spring clamp is adapted, in thickness, length and width, to completely fill the recesses, blending neatly therein flush with the exterior of the parts which it unites, except for the narrow space 23, which provides means for the insertion of a lever-like implement, shown in broken lines at X, in Figure 2, used for its removal.

The clamp obviously may be entered in the recesses by snapping its end portions over and past the axial center of the parts which are thereby firmly embraced and constrained to operate as a unit. The manner of removal is indicated in Figure 2, the lever X easily springing one end free of the recess and raised therefrom.

It will be understood that increased security may be obtained by the use of such additional spring clamps as may be required.

Having thus described the invention, what is claimed as new and desired to be secured by Letters Patent of the United States is:

In a cylinder composed of two equal longitudinal sections, each section having one or more semi-annular recesses extending from its chordal flat contact edge to substantially 120 degrees therearound, a spring clamp enterable in said recesses to bind said sections firmly together, the length of said clamp being slightly less than the aggregate length of said recesses.

SIDNEY V. HAAS, Jr.